June 4, 1929.    F. H. BIGGS    1,716,101
CAR UNLOADER
Filed July 15, 1922
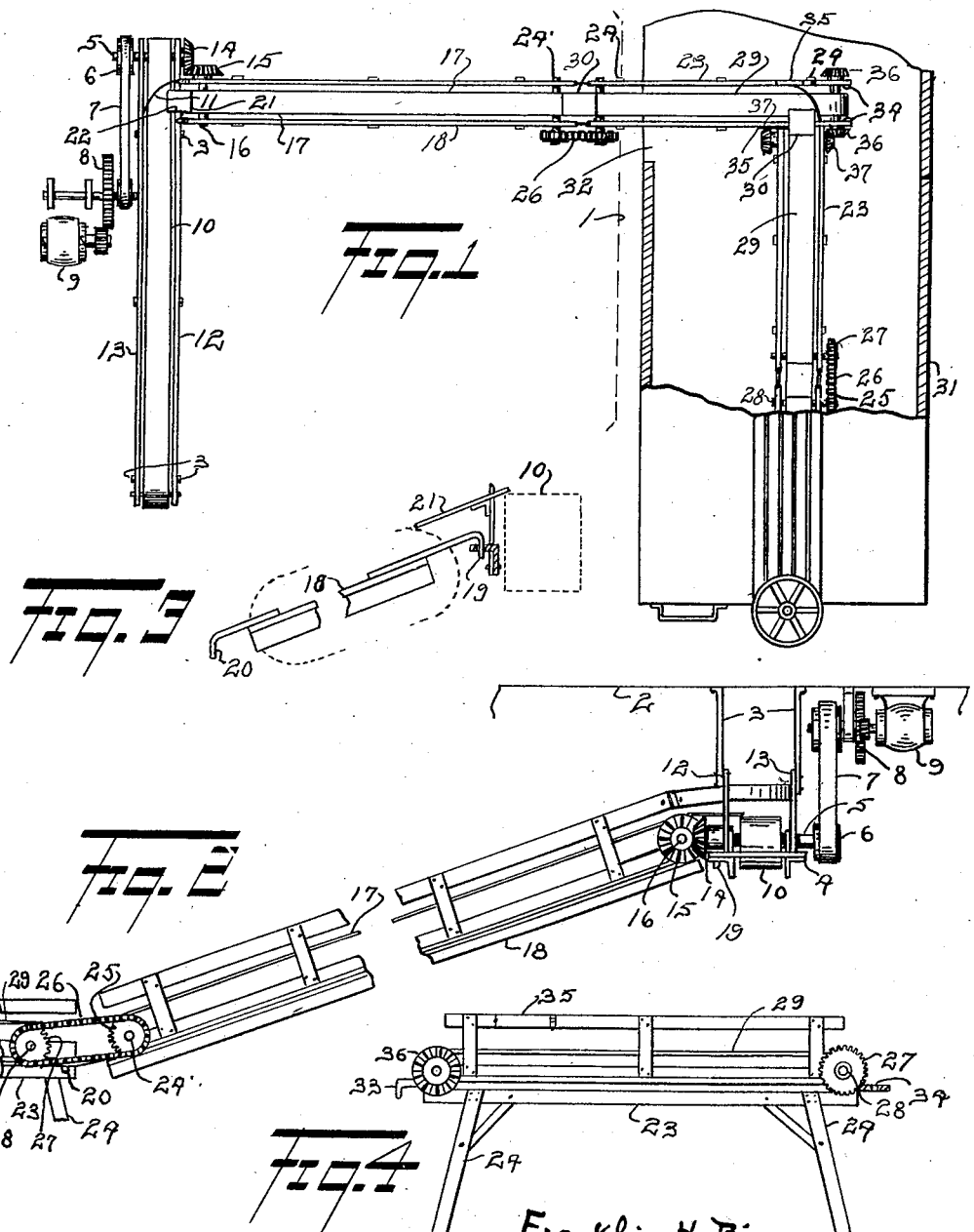

Patented June 4, 1929.

1,716,101

UNITED STATES PATENT OFFICE.

FRANKLIN H. BIGGS, OF TOLEDO, OHIO.

CAR UNLOADER.

Application filed July 15, 1922. Serial No. 575,298.

This invention relates to conveyor mechanism.

This invention has utility in sectional conveyors, more especially adapted for unloading of cars, say when filled with bulk cans.

Referring to the drawings:—

Fig. 1 is a plan view, with parts broken away, of an embodiment of the invention as extending from a car into a warehouse;

Fig. 2 is a view in side elevation, with parts broken away, of features of the sectional conveyor;

Fig. 3 is a view on an enlarged scale, with parts broken away, showing features of interconnection between conveyor sections; and Fig. 4 is a side elevation of one of the conveyor sections.

In warehouse 1 there may be suspended from ceiling 2 by hangers 3 a frame 4 carrying shaft 5 having pulley 6 driven by belt 7 from speed reduction gearing 8 as actuated by motor 9. The drive shaft 5 may operate belt conveyor 10 say for handling cans as guided thereupon by arm 11, said cans traveling along with the belt 10 as retained by guide bars 12, 13. This conveyor belt 10 may deliver cans for storage in a warehouse or for their disposal as may be desired, for instance in delivery to can fillers as disclosed in Patent No. 1,290,055. When adapted to this latter delivery direct to the can filling machines, this disclosure has its maximum utility in that there is automatic delivery of the cans from the car with their distribution for filling and no necessity for any intermediate attention or re-handling.

The drive shaft 5 is shown as provided with bevel pinion 14 which may be placed in mesh with bevel pinion 15 on shaft 16 for operating belt conveyor section 17 as carried by downwardly inclined frame 18 sustained by hook connections 19, 20, the hook connection 19 being with the frame 4 at the upper end of this inclined conveyor frame 18. This belt conveyor 17 as a follower section urges the articles as carried upward thereby upon a platform 21 through a door 22 in the side guide bar 12, and in passing over this guide platform 21 a can is directed by the arm 11.

In the permanent installation of the frame 4 in this conveyor belt 10, such may advantageously be in an overhead position clear of floor operations for usual warehouse trucking or loading and unloading of cars as may generally be found desirable. However, in the instance of receiving small articles, as empty cans for filling, this conveyor may at once be brought into use for unloading the car by connecting to this conveyor 10, the conveyor section 17. This conveyor section 17 at its lower end near the car door may have the hooks 20 engage in frame 23 mounted on legs 24. This belt conveyor 17 has at its lower end follower shaft 24' carrying sprocket wheel 25 and with this hook connection 20 with the frame 23, the interengaging seats serve for maintaining follower drive spaced relation for drive connection from the sprocket wheel 25 by sprocket chain 26 about sprocket wheel 27 on shaft 28 carried by the frame 23 for driving second follower belt conveyor 29 so that cans or other articles thereon may pass over platform 30 and be delivered to upwardly inclined belt 17 of the first follower belt or conveyor section. The legs 24 of this second conveyor section frame 23 may rest at one end in the warehouse, and at the other end in box car 31 by passing through door 32 of this box car.

The uniformly piled or ricked up cans in the car 31 may be placed by an unloader upon the belt 29 and as the main belt 10 is operating the follower belts 17 and 29 will take these cans and deliver them to the main stationary drive conveyor 10. As the unloading of the car 31 progresses, additional sections may be placed on either side of the frame 23 as may be found desirable. These supplemental sections may be similar in every respect to the frame 23 with its belt 29.

These frames 23 at one end carry hooks 33 as seats for engagement into frame 23 of the conveyor to which it may be connected at one end while the opposite end is provided with notches or seats 34 for receiving hooks from a succeeding section. This first follower section from doorway or entrance into the car, and a third follower section of the series, are conveniently placed at right angles for lateral delivery through an opening in the side guide means formed by shifting a section 35 thereof to thereby provide a gate to first conveyor belt 29 of the second follower section. These gates 35 are on opposite sides of the frame 23 so that the third follower section may be placed upon either side and as so placed and held by its interengaging seats, a bevel pinion 36 of the second follower section is in mesh with bevel pinion 37 of third follower section. These pinions 36, 37, are upon opposite sides of the respective sections so that there may be the connections for either direction of extension into the box car 31. These sections 23 are each mounted on their own legs 24 as extending back into the car and it is convenient to have more than one of these extensions back into the car so that the operator has only to place the cans on the conveyors without any occasion to walk in so doing.

A fourth follower section may be connected from sprocket wheel 27 by means of sprocket chain 26 to sprocket wheel 27 of the succeeding follower section. Platform 30 between the sections is for properly guiding the cans over the space between the respective belt conveyors. A skilled operator may insert each of his four fingers of each hand into separate one-pound cans, and by bringing these two spaced groups of four cans each toward each other, may hold additional cans between the eight as held in both hands, and by manipulation place these cans upon the belt conveyors very rapidly and so by this rapid manual delivery to a belt conveyor the cans may pass end up with these open end cans for deposit away from the car in a warehouse or at a filler or other location as desired.

What is claimed and it is desired to secure by United States Letters Patent is:—

1. A suspended conveyor, an elevating conveyor section for delivering laterally and extending upward, a leg sustained follower conveyor section supporting the lower end of the elevating conveyor section and driving means for the suspended section connected to actuate the other sections.

2. Supporting means, mounted for depending from a ceiling, a horizontally extending belt conveyor carried by said supporting means, a driving shaft for said conveyor, a motor sustained from said ceiling and connected to drive said conveyor shaft, said conveyor having lateral guides providing an entrance way spaced from the end of said conveyor adjacent said shaft, a bevel pinion on said shaft, an elevating belt conveyor as follower section having detachable connection with said supporting means and provided with a bevel pinion held in mesh with the pinion of the horizontally extending conveyor shaft pinion by said detachable connection, a second follower section belt conveyor having detachable connection for supporting the lower end of the first follower section, sprocket gear connection between the first and second follower sections, a third follower section belt conveyor, bevel gear driving means from the second section to the third section, detachable connection between the second and third sections for holding the gearing in mesh, and lateral guide means on the follower sections, said second follower section guide means remote from its connection to the first follower section having an entrance way for receiving material from the third follower section.

3. A conveyor section comprising a support, parallel guides therealong, a belt conveyor between said guides, a shaft near each end of said support, a sprocket wheel on one shaft and a bevel gear on each end of the other shaft, whereby the section may serve as an intermediate conveyor, and power transmitting means for an aligned section at one end and for a section at an angle in either direction at the other end.

4. A belt conveyor having side guides providing entrance ways from each side of said belt conveyor, a connection for detachably connecting the second conveyor section for driving from the first belt conveyor to deliver articles through one of said ways upon said belt conveyor.

5. A variable extent conveyor installation comprising a first conveyor, driving means therefor, a conveyor extension or intermediate section for connection in different assembly directions from the first conveyor embodying a sprocket wheel at one end and a bevel pinion at the other end, actuating connections from the sprocket wheel for transmission to a section in line therebeyond, gearing transmission for a laterally adjacent branch conveyor section, and a bevel pinion for driving said extension conveyor section laterally as to an adjacent branch conveyor section, additional independently connectible sections in series provided with independent supporting means locating the sections in a common material carrying plane proximity, whether in straight line or branch extent as assembled from said driving conveyor through said actuating connections in series, said intermediate sections being respectively endless belt conveyor transmissions in a series from the first conveyor to the terminal additional section.

In witness whereof I affix my signature.

FRANKLIN H. BIGGS.